Dec. 1, 1936. L. VON HAZSLINSZKY ET AL  2,062,488
DEVICE FOR AUTOMATICALLY CONTROLLING THE TOOTHED
WHEEL CHANGE GEAR OF MOTOR VEHICLES
Filed Sept. 5, 1934    2 Sheets-Sheet 1
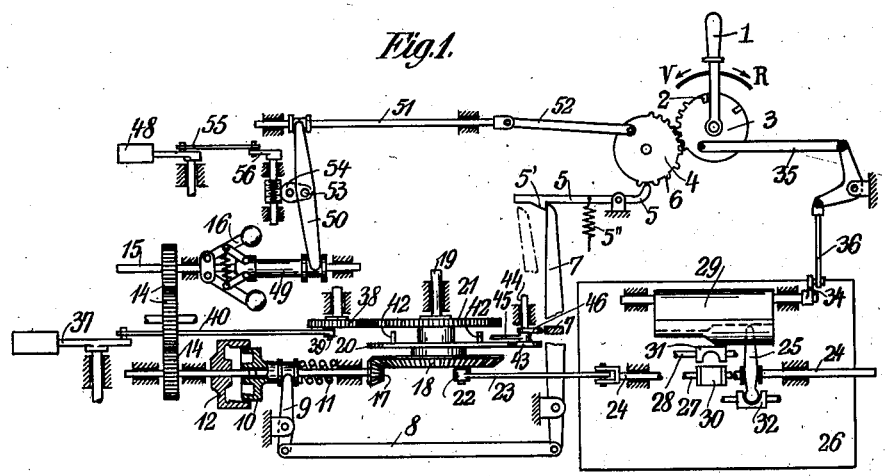
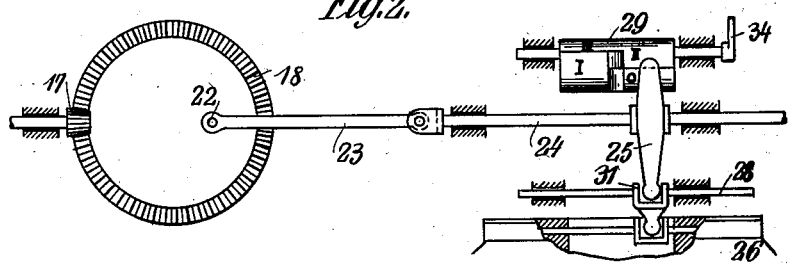
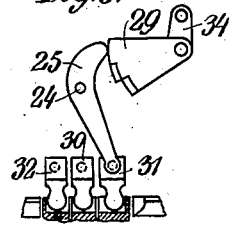 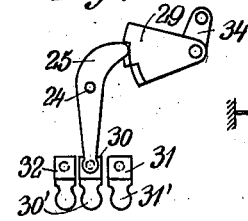 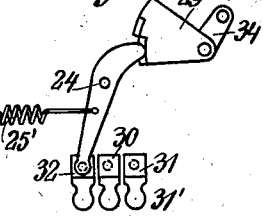
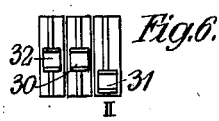 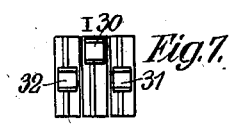 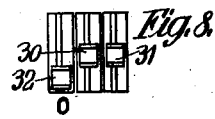

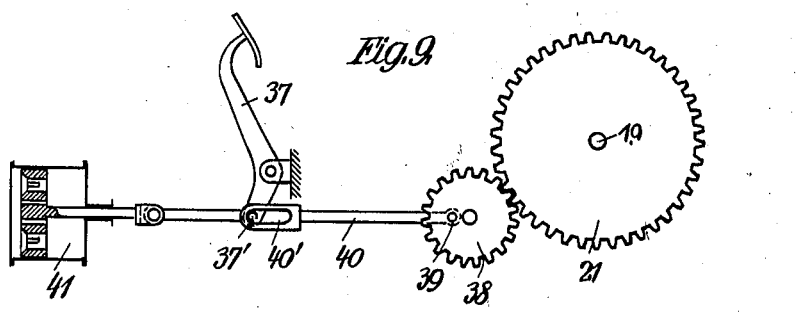
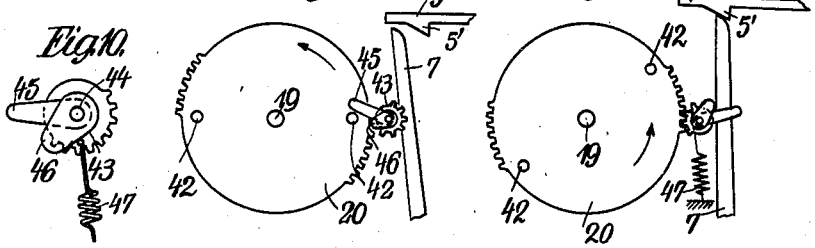
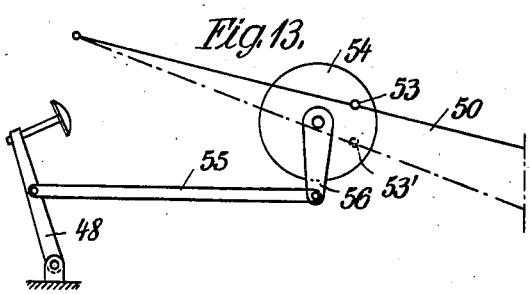
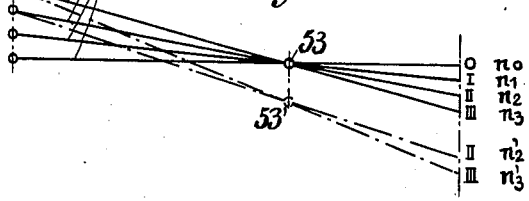

Patented Dec. 1, 1936

2,062,488

UNITED STATES PATENT OFFICE 2,062,488

DEVICE FOR AUTOMATICALLY CONTROLLING THE TOOTHED WHEEL CHANGE GEAR OF MOTOR VEHICLES

Ladislaus von Hazslinszky and Georg von Lukács, Budapest, Hungary, assignors of one-third to Josef Lang, Budapest, Hungary Application September 5, 1934, Serial No. 742,710
In Germany September 13, 1933

6 Claims. (Cl. 74—336.5)

This invention relates to a device for the automatic control of the toothed wheel change gear of motor vehicles. The known devices of this kind are open to the objection, that they require considerable alterations in the change gear, whereby the fitting in is rendered very difficult, especially in vehicles made in series, so that their employment is very inconvenient and expensive. The device according to the invention, however, can be easily fitted in any motor vehicle with standard change gear without any alteration of this gear.

The device according to the invention essentially comprises a stepped, elongated control member, which is adjustable in steps and automatically by means of a centrifugal speed governor in dependency upon the number of revolutions of the engine, and thus brings a catch, which is common for all the shifting forks of the gear into engagement with the fork of the corresponding speed, and a driving mechanism which shifts the catch at each fresh adjustment of the control member. This driving mechanism, actuated by an auxiliary clutch continually driven by the engine, is normally locked and released by a shifting element at every stepwise adjusting of the control member, and a blocking device actuated thereby. The driving mechanism effects only a reciprocating movement of the catch of the gear speed and is automatically locked after each of such movements. In the middle of each reciprocating movement of the catch it is at the same time swung into the associate shifting fork at the gear by passing from one step on to the next following step on the control member. An oscillatable transmission element is interposed in the connection between the centrifugal governor and the shifting element for the stepped control member, the axis of this transmission element being positively adjustable by means of the accelerator, so that it changes the dependency of the adjustment of the shifting element upon the movements of the governor and enables a desired increased travelling speed to be obtained before the automatic change takes place. For starting up and stopping the device and the vehicle, and also for changing to reverse drive, the device has a separate starting element, which operates in such a manner that it adjusts the control member to the first speed step and at the same time disengages the blocking mechanism of the auxiliary clutch. This auxiliary clutch, which is connected with the control mechanism of the change gear by means of a toothed wheel-connecting rod gearing becomes thus operative, engages the first speed gear and then the engine clutch so that the vehicle starts up in the first speed. The other changing to the next following speeds is effected automatically by the device in dependency upon the number of revolutions of the engine which is increased and decreased by the road conditions.

An embodiment of the invention is illustrated by way of example in the accompanying drawings in which:—

Fig. 1 shows the arrangement diagrammatically partly in elevation and partly in plan view, the shifting element or catch 25 and the control member 29 being in top plan view to Fig. 5.

Fig. 2 shows a portion of the driving mechanism in plan view on a larger scale and the shifting element or catch 25 and control member 29 are shown in front elevation to Fig. 3.

Figs. 3 and 6, 4 and 7, and 5 and 8 show in side elevation and plan view respectively the stepwise adjustments of the control member and catch, and the corresponding control positions of the change gear.

Figs. 9 to 12 show details of the blocking mechanism serving for engaging and disengaging the auxiliary clutch.

Fig. 13 shows a form of construction of the arrangement of the oscillatable transmitting element adjustable by the accelerator and situated between the governor and the shifting element of the control member.

Fig. 14 is a diagram showing the operation of the arrangement illustrated in Fig. 13.

In Fig. 1 16 designates a centrifugal governor continually driven by the engine through the intermediary of a shaft 15; 10 and 12 designate a known auxiliary clutch the one stationary half 12 of which is continually driven by the governor shaft 15 through the intermediary of toothed wheels 14, whereas the other shiftable clutch half 10 is securely held in the disengaging position against the action of a spring 11 by a lever-blocking mechanism 9, 8, 7, 5 which is normally blocked. 4 is a control disc provided on its periphery with several projections 6 cooperating with the lever blocking mechanism 5, 7, 8, 9, said projections, during the rotation of the disc 4, disengaging the blocking mechanism and thus engaging the auxiliary clutch 10 and 12 under the action of the spring 11. 51 and 52 designate a connecting rod gearing actuated by a governor sleeve 49 through the intermediary of a two-armed rocker lever 50, the connecting rod 52 being pivotally connected with the control disc 4 so that this disc is rotated by the governor 16 in dependency upon the number of revolutions of the engine. 3 is a change disc which engages with the control disc 4 by means of teeth extending into the range of movement of both discs and adapted to be adjusted by means of a handle 1, so that the control disc 4 can also be adjusted by means of the handle 1 and the change disc 3 can also be adjusted by the governor 16 in dependency upon the number of revolutions of the engine, through the intermediary of the lever 50, the connecting rod gearing 51, 52 and the control disc 4. 29 is a stepped control member in the shape of a cylindrical sector and oscillatable about its vertical line. The control member is positively connected with the control disc 3 by a lever system 34, 36, 35 and with the governor by the control disc 4 and the rod system 52, 51, 50, so that its oscillations and adjustments take place in dependency upon the number of revolutions of the engine. 25 is a two-armed catch for the speed gears, one arm of said catch cooperating with the control member 29 and the other arm with the shifting forks 30, 31, 32 of the change gear. This catch is pivotally but non-shiftably mounted on a connecting rod 24 and is pressed against the periphery of the control member 29 by means of a spring 25' (Fig. 5), whereas its other end is of spherical shape and movable within the range of the shifting forks 30, 31, 32 of the gear. The periphery of the control member is stepped transversely to its axis, the steps being so dimensioned that they successively swing the catch 25 from one shifting fork into the next following shifting fork 32, 30, 31 of the gear speeds. The individual step-sections are situated each on one half of the length of the periphery of the control member. The transition from one step to the next takes place in the longitudinal middle plane of the control member. The connecting rod 24, which carries the catch 25, forms a part of the toothed wheel-connecting rod driving mechanism 17, 18, 22, 23, 24 connected with the auxiliary clutch 12, 10. 17 is a bevel wheel on the shaft of the auxiliary clutch, 18 a bevel wheel meshing with the wheel 17, 22 a crank pin on the bevel wheel 18 and 23 a crank rod to which the connecting rod 24 is hingedly connected.

The further development of the device serves to actuate the auxiliary clutch 12, 10 at each step movement of the control member 29 and to limit its rotation so that each time only a to-and-fro movement of the connecting rod 24 carrying the catch 25 takes place. This arrangement will be hereinafter described in conjunction with the operation of the device.

If the handle 1, which is loosely mounted on the axle of the disc 3, is shifted towards the left into the forward position V (Fig. 1), it rotates the control disc 3 by means of an abutment 2 and adjusts this disc and also the disc 4. The short arm of the pawl 5 pressed against the disc 4 by a spring 5" is momentarily pushed away from the disc by one of the projections 6 on the disc 4, and the locking nose 5' on the long arm of the pawl liberates the two-armed lever 7. This lever 7 is connected with the shiftable half 10 of the auxiliary clutch by means of the connecting rod 8 and the two-armed lever 9, which clutch half, after the lever 7 has been released, engages the stationary half 12 of the auxiliary clutch under the action of the spring 11. The engaged auxiliary clutch now rotates the bevel wheel 18 through the intermediary of the bevel wheel 17 connected with the shaft of the clutch half 10. Wheels 20 and 21 are mounted on the shaft 19 of the bevel 18, the wheel 21 being a toothed wheel. The connecting rod 23 is hingedly connected with the bevel wheel 18 by means of the crank pin 22 and shifts the connecting rod 24 and the catch 25 mounted thereon along the control member 29 from one extreme position into the other. Figs. 1, 5, and 8 show the initial or idle running position. When turning the lever 1 from the idle running position shown in Fig. 1 into the "forward" position V, the control member 29 is slightly oscillated downwards by means of the disc 3 and the rods 35, 36, 34 and immediately thereafter the pawl 5 is disengaged so that the auxiliary clutch is engaged and the connecting rod 24 with catch 25 is shifted to the left. The width of the step face o (Fig. 2) is such that at the slightest downward oscillation of the control member the catch still presses in the range of the face o against the control member and does not strike against the edge between steps o and II. At the subsequent shifting of catch 25 from right to left, this catch 25 shifts the fork 32 to the middle of the length of the control member 29 as shown in Fig. 7. At the middle of the length of the control member the catch arm, bearing against the control member, is lifted by the inclined face between the step faces o and I upon the higher step I. Its other arm moves away from fork 32 and is oscillated into the shifting fork 30, which is pressed upwards by the control member during the second half of its shifting movement to the left, as shown in Fig. 7. The first speed is thus engaged.

If, owing to further increasing of the speed of the engine a further downward oscillation of the control member 29 takes place, a longitudinal line of the envelope of step I of the control member is brought into contact with the catch 25, this line being opposite step II of the right hand half of the control member. During the subsequent fresh displacement of the catch to the right in consequence of the disengaging of pawl 5 and engaging of the auxiliary clutch by the governor, the catch arm moves over the inclined face between the steps I and II on to the step II of the control element. During this movement the other arm of the catch moves out of shifting fork 30 in the middle of the length of the control member, is engaged into the shifting fork 31 and brings this fork into the right hand or lower extreme position, as shown in Figs. 2 and 6. The second speed is thus engaged.

For engaging the third speed only a shifting of the shifting fork 31 from the right to the left into the extreme position has to be effected. If, when the engine runs at the corresponding speed the last oscillation of the control member 29 in downward direction takes place, the point at which the catch arm bears against the control member moves on to a longitudinal line of the envelope about the edge between step I and III (Fig. 3), and the subsequent shifting of the catch then takes place on the control member from right to left and from step II to step III without oscillation of the catch, as the steps II and III belong to a common cylinder face.

During the shifting back from step III to step II or from the third to the second speed the control member is at first oscillated a little in upward direction by the rod system of the governor with corresponding reduced speed of the engine. As the rod 36 engages by a slot (not shown in the drawings) over the stud of the crank 34 on the control member, the first upward oscillation of the control member is less great than the last downward oscillation during the changing from step II to step III. The point at which the catch arm bears on step III of the control member can therefore not move over the edge between step III and step I on the left half of the control member during the first upward oscillation of the control member, and the subsequent shifting to the right of the catch from step III to step II takes place without oscillation of the catch. The latter consequently returns the shifting fork 31 into its initial position as shown in Fig. 6, in which the second speed is engaged. The step II on the control member is wide enough that, also during the next following oscillation of the control member in upward direction up to the renewed disengaging of the locking mechanism the point at which the catch bears on the face of step II remains the same. During its next following shifting to the left the catch drops over the inclined face between step II and step I and is thereby oscillated from the shifting fork 31 into the shifting fork 30, which it moves into the position shown in Fig. 7.

In the similar manner the backward shifting from step I to step O is effected, or from the first speed into the idle running position. The automatic backward shifting from the first speed to idle running can, however, not take place as long as the hand lever 1, which has been turned in anti-clockwise direction during the engaging of the first speed (Fig. 1) and which is lockable, is not turned back into its initial position, as the abutment 2 of disc 3 strikes against the hand lever during the engaging of the first speed and prevents disc 3 from rotating backwards. Such backward rotation is, however, necessary to oscillate the control member 29 still further backwards in upward direction into the idle running position. For engaging to idle running for the first, second or third speed, the lever 1 has therefore to be turned back into the initial position.

The hand lever 1 can be still further turned from this initial position in clockwise direction (direction R in Fig. 1) in order to engage from idle running to backward running. The hand lever 1 rotates during this movement the disc 3 by means of an abutment which is opposite abutment 2 at the right of the hand lever. The idle running is established in the gear in that the shifting fork 32 is shifted from its right hand or lower extreme position (Fig. 1 or Fig. 8) into its left hand or upper extreme position. If the control member 29 during the engagement of the backward running is set into its uppermost oscillated position, the catch 25 comes into a position of the idle running step O of the control member which extends over the whole length of the control member, so that, when the release of the locking mechanism and engagement of the auxiliary clutch is effected thereby, the catch 25 is shifted to the left without any oscillation of the catch taking place at the same time. During the changing over from backward running to idle running by means of the hand lever 1 the disc 3 carries out a rotation in the direction V. As thereby the rod 36 is lifted from its lowermost position and as this rod, by means of a slot (not shown in the drawings), acts upon the stud of the crank arm 34 of the control member, almost no downward oscillation of the control member will take place, and the catch remains therefore in the lowermost position of step O of the control member and shifts back, during the subsequent releasing of the locking mechanism and engaging of the auxiliary clutch, the shifting fork 32 towards the right into the idle running position (Fig. 3) from which by the hand lever 1 the first speed can be engaged as already described above. The changing forks are guided on rods 27 and 28 and engage by means of extensions 30', 31' in the ordinary changing forks of the gear, as shown in Fig. 2.

As soon as the speed gear has been engaged, that is as soon as the bevel wheel 18 has rotated through a half revolution, the bevel wheel 18 and its shaft 19 must come to a standstill. This is effected by disengaging the auxiliary clutch 10, 12 in the following manner: Almost up to the end of the half revolution of the bevel wheel 18 the lever 7 of the blocking mechanism is in the position shown in dot-dash lines in Fig. 1, in which the auxiliary clutch is engaged. A wheel 20 (Figs. 1, 10, 11, 12) mounted on the shaft 19 of the bevel wheel 18 is provided with toothed portions extending through an angle of about 45° at two diametrically opposite points of its circumference. The wheel 20 has pins 42 projecting from the wheel plane one near each of the first teeth of the toothed portions in the direction of rotation, these pins engaging with a small, partly toothed wheel 43 (Fig. 10) which is keyed on a shaft 44 and made in one piece with a lever 45 and a cam 46. Before the wheel 20 has completed a half revolution one of the pins 42 comes into contact with the lever 45 projecting over the plane of the wheel 20 and swings this lever until the first teeth of the wheels 20 and 43 intermesh. Thus, the wheel 43 will be rotated and its cam 46 presses back the lever 7 into its initial blocking position (Figs. 11, 12). The rotation of the wheel 43 is accelerated by a tension spring 47, and the lever 7 is finally again engaged by the nose 5' of the pawl 5 and the auxiliary clutch 10, 12 disengaged and blocked. Thus, the shaft 19 and its wheels 18 and 20 come to a standstill after a half revolution.

As is known, the motor clutch must be disengaged after each speed change, this having been hitherto effected by depressing the clutch pedal 37 (Fig. 9). In the case of the device according to the invention the disengagement takes place automatically by means of a toothed wheel 21 (Figs. 1 and 9), which is likewise mounted on the shaft 19 and drives a small toothed wheel 38 of half the diameter of toothed wheel 21. This toothed wheel 38 turns the lower arm of the clutch pedal 37 during a quarter revolution of the wheel 21 by means of its crank pin 39 and a connecting rod 40 and thus disengages the motor clutch, so that the change in the change gear can be carried out without hindrance. During the second quarter revolution of the toothed wheel 21, which again corresponds to a half revolution of the toothed wheel 38, the wheel 38 pushes back the connecting rod 40. The free end of this rod has a slot 40', in which the pin 37' of the pedal 37 can move freely during the return movement of the rod 40, so that the return movement of the engine clutch pedal 37 is correspondingly braked by an oil brake cylinder 41 and the motor clutch is gradually re-engaged. As the shifting of the catch 25 is effected by a half revolution of the shaft 19 of the bevel wheel 18 and as further midway during this shifting movement first the one speed is disengaged and during the second half of this movement the other speed is engaged, it is evident that the disengagement and engagement of the engine clutch is effected by the toothed wheel 38 whereas the disengaging and engaging of the speed is effected by the catch 25.

The governor 16 driven by the engine shaft continues to rotate during the changing and effects in the manner described the engagement of the second and third speeds, as soon as the chosen, initial portion of the accelerator 48 (Fig. 1) causes an increase in the number of revolutions of the engine according to the existing road conditions. The sleeve 49 of the governor then pulls the lower arm of the rocker lever 50 towards the left, whereas the other arm shifts the rods 51 and 52 towards the right so that the control disc 4 is rotated a distance equal to one projection 6. Thus, the pawl 5 must always release the blocking lever 7 and engage the auxiliary clutch 10, 12, and at the same time the control disc 3 rotates the control member 29 through an angle which adjusts the next change step relative to the catch 25.

The governor 16 and the length of the arms of the transmission lever 50 are so chosen that the engaging of the succeeding speed step can only take place when the number of revolutions of the engine has changed, for example by more than 20%. If the most favorable number of revolutions of the engine is for example 3000 revolutions per minute and the vehicle travels at the third speed at this number of revolutions, that is with direct engine coupling on a level road, and comes to an ascent which reduces the number of revolutions of the engine to 2400 revolutions per minute, the device changes to the second speed step. The engine again attains almost its original number of revolutions of 3000 revolutions per minute. In order to ensure this 20 percent upward and downward change from the minimum acceleration up to the maximum acceleration position of the accelerator, the pivot pin 53 of the transmission lever 50 is not stationary but is adjustably mounted in that it is mounted on a rotatable disc 54 (Fig. 13) and can be shifted by the pedal 48 from the position 53 into the position 53' by rotating the disc 54. The disc 54 is connected with the accelerator 48 by a crank 55 and a rod 56 and, if desired, also by a self-locking worm gear (Fig. 1) and rotates when the pedal is depressed so that the pin 53 comes into the position 53' indicated in dotted lines in Fig. 13. Thus, the position of the lever is changed so that it now no longer engages the small speed at the originally determined number of revolutions but at a higher number of revolutions. By this adjustable mounting of the pivot pin 53 of the rocker lever 50 it is therefore possible to actuate the device to a higher or lower speed, during the actual position of the accelerator 48, if the number of revolutions corresponding to the actual pedal position is increased or reduced by 20% because the speed of the vehicle increases when travelling on a downward gradient or increases when travelling on an upward gradient, but not when the acceleration is changed. Fig. 14 is a diagram showing the different positions of the rocker lever 50 at idle running "O" and at the speeds I, II and III, which correspond to the speeds of rotation $n_0$, $n_1$, $n_2$ and $n_3$, respectively. When, for example, the vehicle is travelling on an upward gradient in the second speed "II" and the driver depresses the accelerator in order to accelerate the vehicle, the adjustable pin 53 passes into the position 53', the vehicle travels more quickly and the changing of the speed at the end of the gradient from the second into the third step no longer takes place at the number of revolutions $n_2$ but at the increased number of revolutions $n_2'$ so that the desired acceleration of the vehicle is attained.

The operation of the device by means of the handle 1 (Fig. 1) is restricted to the forward and reverse starting up, and to the stopping of the vehicle. In the case of sudden stopping, the handle is brought into its neutral, middle position whereby the device immediately brings the gear into idle running position.

The constructional details of the device may be varied without departing from the scope of the invention.

We claim:—

1. In a device for the automatic control of the toothed wheel change gear of motor vehicles, the combination of shifting forks one for each of the different speed trains, a catch oscillatably and slidably mounted above said forks, a driving mechanism for shifting said catch, an auxiliary clutch adapted to drive said driving mechanism, an adjustably mounted stepped control member, said catch cooperating with said control member, and means for displacing said control member in dependency upon the number of revolutions of the engine to swing said catch into one of said shifting forks of the gear.

2. In a device for the automatic control of the toothed wheel change gear of motor vehicles, the combination of shifting forks one for each of the different speed trains, a catch oscillatably and slidably arranged above said forks, an elongated control member, longitudinal steps on said control member corresponding to the speed trains, the transition from one step to another being in the longitudinal middle of said control member, means for resiliently pressing said catch against said steps, said catch being shiftable longitudinally of said steps and adapted to be oscillated by said control member from one shifting fork to the adjacent fork, and means for shifting said control member in dependency upon the number of revolutions of the engine, a driving mechanism adapted to shift said catch, and an auxiliary clutch adapted to drive said driving mechanism.

3. In a device for the automatic control of the toothed wheel change gear of motor vehicles the combination of shifting forks one for each of the different speed trains, an elongated control member having longitudinal steps, a catch adapted to cooperate with said forks to engage the different speed trains, means for swinging said catch against said steps and into the corresponding shifting fork and for shifting the same in the longitudinal direction of said steps, means for shifting said control member in dependency upon the number of revolutions of the engine, a connecting rod carrying said catch, a driving wheel and an auxiliary clutch, said auxiliary clutch driven by the engine and said driving wheel driven by said clutch, said connecting rod being hingedly connected eccentrically on said driving wheel and moved backwards and forwards by said driving wheel.

4. In a device for the automatic control of the toothed wheel change gear of motor vehicles, the combination of shifting forks one for each of the different speed trains, an oscillatable catch with one end in said forks to engage the different speed trains, a shiftable stepped control member bearing against the other end of said catch to bring said catch into engagement with said forks, a control disc, means for transmitting the movement of said control disc to said control member, a governor driven by the engine, a sleeve carried by said governor, means for transmitting the movements of said sleeve to said control disc, a driving mechanism adapted to shift said catch longitudinally of said control member, a blocking mechanism for said driving mechanism, means cooperating with said control disc for disengaging said blocking mechanism in steps, and means for reengaging said blocking mechanism after every displacement of said catch by said driving mechanism.

5. In a device for the automatic control of the toothed wheel change gear of motor vehicles, the combination of shifting forks one for each speed train, an oscillatable catch, an adjustable control member adapted to shift said catch in said forks, a control element adapted to shift said control member, a governor driven by the engine, a rod system on said control element and on said governor adapted to shift said control element in dependency upon the number of revolutions of said regulator and of the engine, an oscillatable transmission lever in said rod system, a pivot pin carrying said transmission lever, means for shifting said pivot pin to change the ratio of transmission of the movements of said regulator to the movements of said control element, a driving mechanism for shifting said catch longitudinally of said control member, a blocking mechanism for said driving mechanism, means for disengaging said blocking mechanism through the intermediary of said control element at every change of speed, means for reengaging said blocking mechanism after each change of speed, and means for disengaging and reengaging the engine clutch during each speed change.

6. In a device for the automatic control of the toothed wheel change gear of motor vehicles, the combination of forks one for each speed train, a catch adapted to engage with said forks, an adjustable stepped control member adapted to shift said catch in said forks in steps and in dependency upon the number of revolutions of the engine, a connecting rod carrying said catch and shiftable longitudinally of said control member, a driving mechanism, an auxiliary clutch actuating said driving mechanism, a driving wheel connected with said connecting rod and adapted to shift said rod from one extreme position to the other, a blocking mechanism for said driving mechanism, means for disengaging said blocking mechanism at each fresh adjustment of a step of said control member and for reengaging said blocking mechanism after every half rotation of said driving wheel, a shaft carrying said driving wheel, a large toothed wheel on said shaft, a small toothed wheel half the size of and meshing with said large toothed wheel, and a connecting rod connected with said small toothed wheel and with the clutch pedal of the engine, said connecting rod adapted to disengage and reengage the engine clutch during each half rotation of said driving wheel.

LADISLAUS von HAZSLINSZKY.
   GEORG von LUKÁCS.